US010091382B2

(12) United States Patent
Yoshida et al.

(10) Patent No.: US 10,091,382 B2
(45) Date of Patent: Oct. 2, 2018

(54) ILLUMINATION APPARATUS AND SENSOR UNIT

(71) Applicant: CANON COMPONENTS, INC., Kodama-gun, Saitama (JP)

(72) Inventors: Hidemasa Yoshida, Saitama (JP); Yoshihiko Tsumekawa, Saitama (JP); Akihito Takeshita, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/482,079

(22) Filed: Apr. 7, 2017

(65) Prior Publication Data

US 2017/0295290 A1   Oct. 12, 2017

(30) Foreign Application Priority Data

Apr. 8, 2016   (JP) .................................. 2016-078209
Apr. 6, 2017   (JP) .................................. 2017-076137

(51) Int. Cl.
| H04N 1/04 | (2006.01) |
| H04N 1/028 | (2006.01) |
| F21V 8/00 | (2006.01) |
| F21V 5/04 | (2006.01) |
| G02B 6/00 | (2006.01) |

(52) U.S. Cl.
CPC ........... *H04N 1/02855* (2013.01); *F21V 5/04* (2013.01); *G02B 6/0001* (2013.01); *H04N 1/02895* (2013.01); *G02B 2006/0098* (2013.01); *H04N 2201/0081* (2013.01); *H04N 2201/0094* (2013.01)

(58) Field of Classification Search
CPC ........... H04N 1/02855; H04N 1/02895; H04N 2201/0081; H04N 2201/0094; F21V 5/04; G02B 6/0001; G02B 2006/0098
USPC ......................................... 358/484, 475, 509
See application file for complete search history.

(56) References Cited

U.S. PATENT DOCUMENTS

| 6,127,675 A * | 10/2000 | Nakamura ......... H04N 1/02815 |
| | | 250/227.26 |
| 7,088,905 B1 * | 8/2006 | Nemoto ............... G02B 6/0038 |
| | | 362/610 |
| 2006/0165370 A1 | 7/2006 | Nemoto et al. |
| 2009/0237747 A1 | 9/2009 | Sawada et al. |

(Continued)

FOREIGN PATENT DOCUMENTS

| JP | 2010021983 A | 1/2010 |
| JP | 2013005321 A | 1/2013 |

*Primary Examiner* — Cheukfan Lee
(74) *Attorney, Agent, or Firm* — Rossi, Kimms & McDowell LLP

(57) ABSTRACT

Provided is an illumination apparatus that applies light to an original, the illumination apparatus including: a light source; and a rod-shaped light guide including: an incident surface that receives the light from the light source; a reflection surface provided with a diffusion portion that diffuses the light incident on the incident surface; and an emission surface that emits, to the original, the light diffused by the diffusion portion. An area of the light guide is reduced by an inclination of the light guide from the incident surface side to a middle part in a longitudinal direction of the light guide, and the light guide is provided with the diffusion portion from the incident surface side to the middle part on the reflection surface.

14 Claims, 11 Drawing Sheets

(56) References Cited

U.S. PATENT DOCUMENTS

2012/0140296 A1 6/2012 Sawada et al.
2013/0314756 A1 11/2013 Amemiya et al.

\* cited by examiner

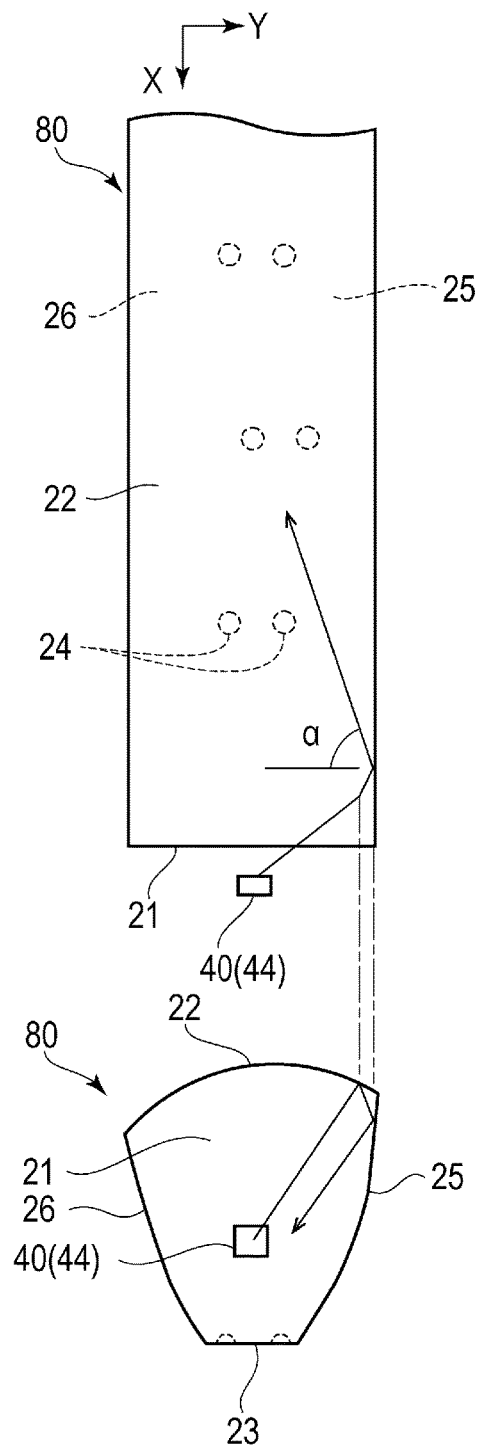
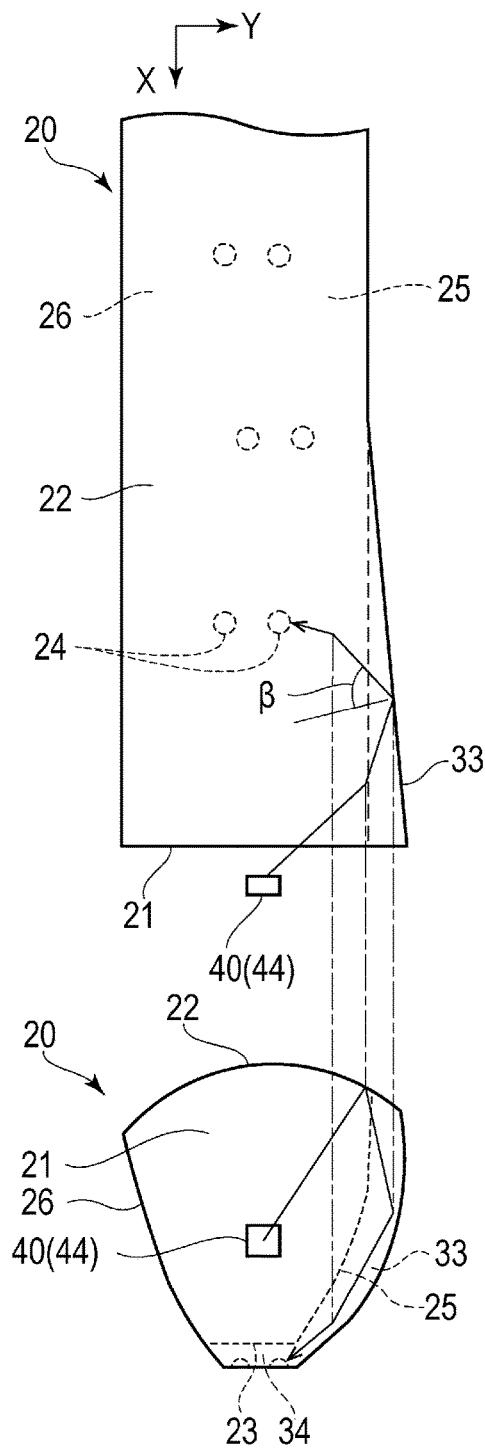

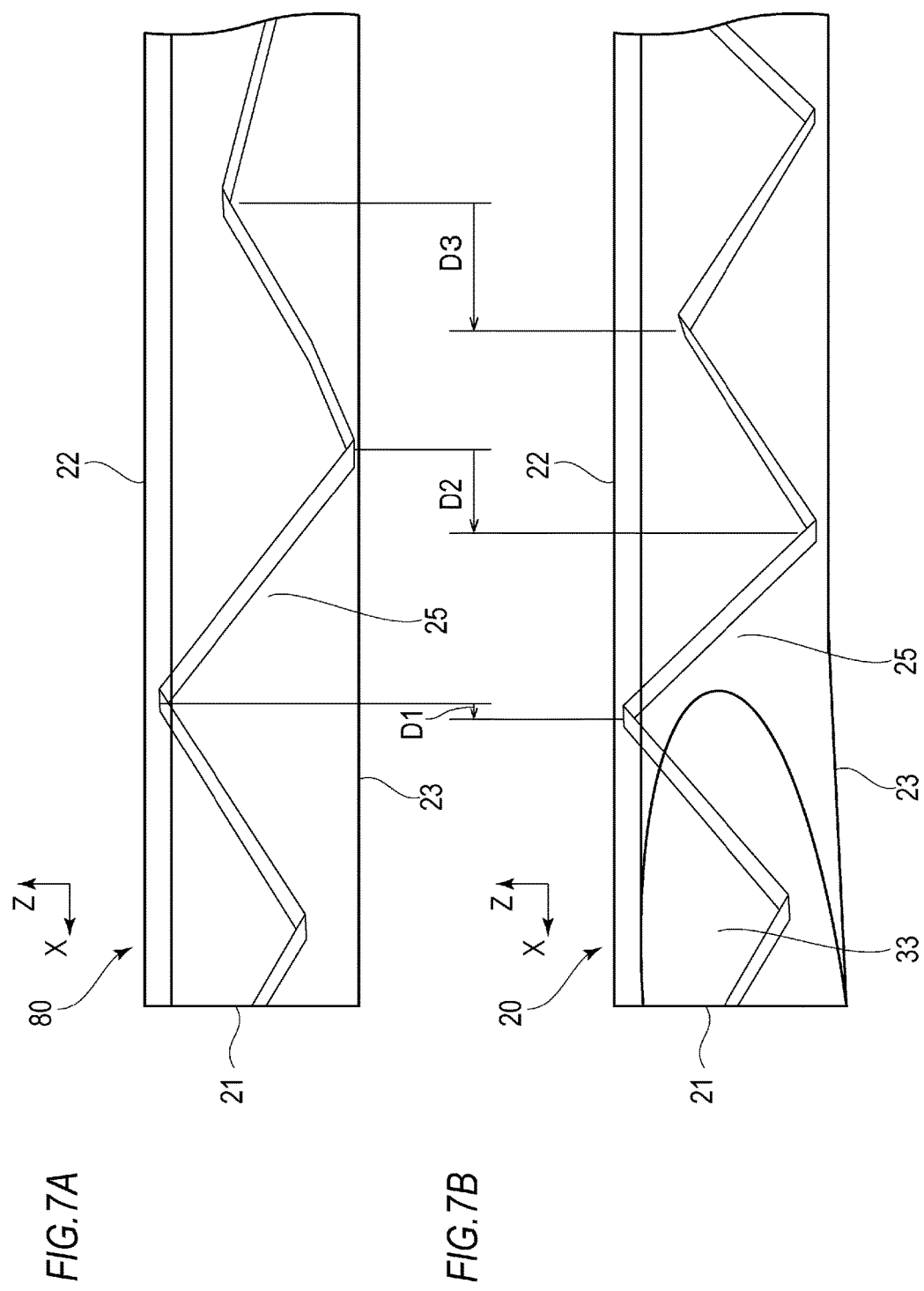

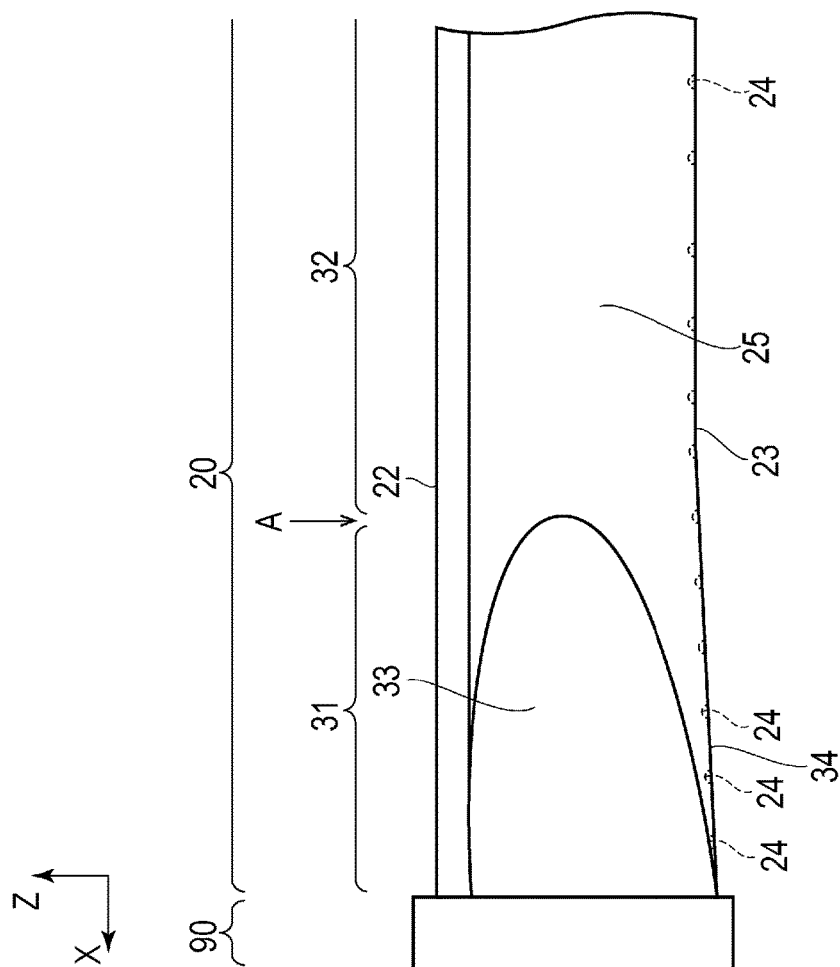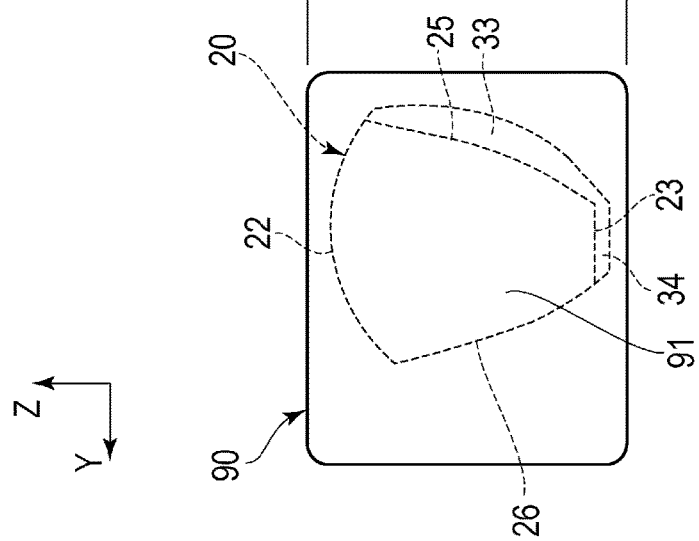

ILLUMINATION APPARATUS AND SENSOR UNIT

CROSS-REFERENCE TO RELATED APPLICATIONS

This application is based upon and claims the benefit of priority of the prior Japanese Patent Application No. 2016-078209, filed on Apr. 8, 2016, and the Japanese Patent Application No. 2017-076137, filed on Apr. 6, 2017, the entire contents of which are incorporated herein by reference.

BACKGROUND OF THE INVENTION

Field of the Invention

The present invention relates to an illumination apparatus and a sensor unit.

Description of the Related Art

An illumination apparatus that linearly illuminates an illuminated object is known.

An illumination apparatus disclosed in Patent Document 1 includes a light guide that emits, from a light emission surface, illumination light incident on an end surface. The light guide of Patent Document 1 has a linear shape, and recessed spherical surfaces are formed on a bottom surface.

A light guide disclosed in Patent Document 2 has a structure with a combination of a pyramid portion and a flat portion and includes a light incident portion, an inclined surface, a light reflection portion, and a light emission portion. The light emission portion is provided with a grained portion as diffusion means.

A light guide disclosed in Patent Document 3 includes an incident surface, a reflection surface, an emission surface, side surfaces, and the like, and an interval between the opposed side surfaces is formed in a trumpet shape expanding toward the incident surface. A pattern surface that produces diffuse reflection of light is formed on the reflection surface.

However, the sectional shape of the light guide of Patent Document 1 is the same at any position in the longitudinal direction. Therefore, the light from a light source tends to be excessively guided in the longitudinal direction, and the amount of light emitted from the light source side is reduced.

In the light guide of Patent Document 2, the diffusion means is provided only on the light reflection portion, and the amount of light emitted from the light source side is reduced.

In the light guide of Patent Document 3, the pattern surface is not formed on the incident surface side, and the amount of light emitted from the light source side is reduced.

Patent Document 1: U.S. Unexamined Patent Application Publication No. 2006/0165370
Patent Document 2: Japanese Laid-open Patent Publication No. 2010-21983
Patent Document 3: Japanese Laid-open Patent Publication No. 2013-5321

SUMMARY OF THE INVENTION

The present invention has been made in view of the problems, and an object of the present invention is to prevent a reduction in the amount of light emitted from a light source side in the light emitted from a light guide.

The present invention provides an illumination apparatus that emits light to an illuminated object, the illumination apparatus including: a light source; and a rod-shaped light guide including: an incident surface from which light from the light source enters; a reflection surface provided with a diffusion portion that diffuses the light entered from the incident surface; and an emission surface that emits the light diffused by the diffusion portion to the illuminated object, wherein an area of the light guide is reduced by an inclination of the light guide from the incident surface side to a middle part in a longitudinal direction of the light guide, and the light guide is provided with the diffusion portion from the incident surface side to the middle part on the reflection surface.

The present invention provides an illumination apparatus that emits light to an illuminated object, the illumination apparatus including: a light source; and a rod-shaped light guide including: an incident surface from which light from the light source enters; a reflection surface provided with a diffusion portion that diffuses the light entered from the incident surface; and an emission surface that emits the light diffused by the diffusion portion to the illuminated object, wherein the light guide further includes: a first side surface in a longitudinal direction of the light guide that is a surface different from the emission surface and the reflection surface; and a second side surface facing the first side surface, an area of the light guide is reduced by an inclination of the light guide from the incident surface side to a middle part in the longitudinal direction of the light guide, and the light guide includes the inclined part only on the first side surface, of the first side surface and the second side surface.

The present invention provides a sensor unit including: the illumination apparatus; a lens array that focuses light reflected by an illuminated object after the light is applied to the illuminated object by the illumination apparatus; and a sensor that converts the light focused by the lens array to an electric signal.

BRIEF DESCRIPTION OF THE DRAWINGS

FIGS. 6A and 6B are views illustrating trajectories of reflection of light;
FIGS. 7A and 7B are views illustrating the trajectories of the reflection of light;
FIGS. 9A and 9B are views illustrating a configuration of the light guide 20 of a second embodiment.

DETAILED DESCRIPTION OF THE PREFERRED EMBODIMENTS

Embodiments of the present invention will now be described in detail with reference to the drawings. The present embodiments provide an illumination apparatus, an image sensor unit (image sensor) 10 to which the illumination apparatus is applied, and an image reading apparatus (reading apparatus) and an image forming apparatus (forming apparatus) to which the image sensor unit 10 is applied. In the image reading apparatus and the image forming apparatus, the image sensor unit 10 emits light to an original P as an illuminated object, and reflected light is converted to an electrical signal to read an image (reflection reading). The illuminated object is not limited to the original P, and objects to be read, such as a bill, can also be applied. Transmission reading for converting transmitted light transmitted through the original P to an electrical signal to read an image can also be applied.

In the following description, three-dimensional directions will be indicated by arrows of X, Y, and Z. The X direction is a longitudinal direction of a light guide described later and is, for example, a main-scan direction. The Y direction is a sub-scan direction perpendicular to the main-scan direction. The Z direction is a perpendicular direction (vertical direction).

First Embodiment

Figure 2:
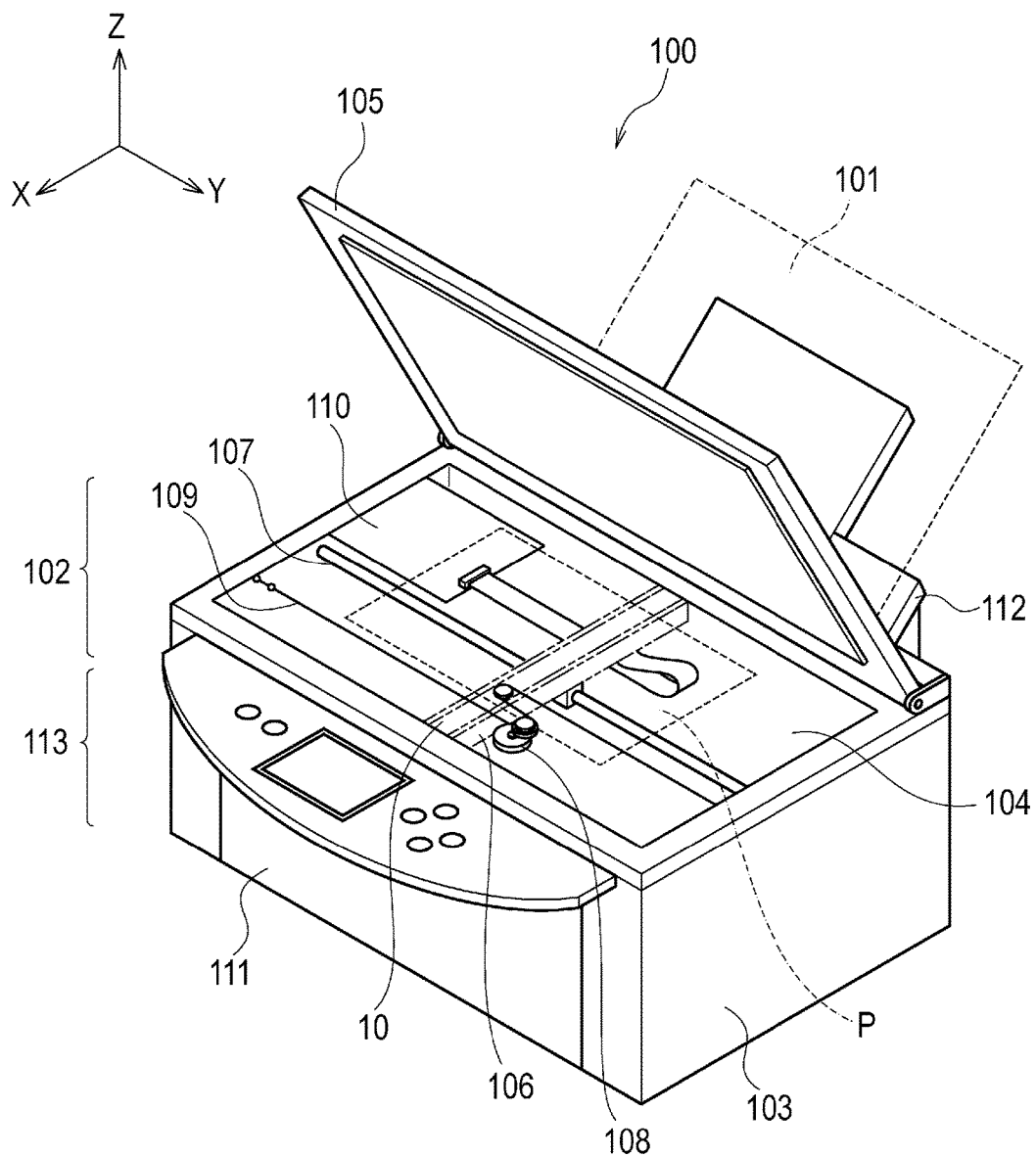
FIG. 2 is a perspective view illustrating an appearance of an MFP 100 including an image sensor unit 10.

A structure of a multi-function printer (MFP) as an example of the image reading apparatus or the image forming apparatus according to the present embodiment will be described with reference to FIG. 2. FIG. 2 is a perspective view illustrating an appearance of an MFP 100. As illustrated in FIG. 2, the MFP 100 includes: an image reading portion 102 as image reading means for reading reflected light from the original P; and an image forming portion 113 as image forming means for forming (printing) an image of the original P on a sheet 101 (recording paper) as a recording medium.

The image reading portion 102 has a function of a so-called image scanner and is configured, tor example, as follows. The image reading portion 102 includes: a housing 103; a platen glass 104 as an original placing portion made of a glass transparent plate; and a platen cover 105 that can be freely opened and closed relative to the housing 103 so as to be able to cover the original P.

The housing 103 houses the image sensor unit 10 including the illumination apparatus, a holding member 106, an image sensor unit slide shaft 107, an image sensor unit drive motor 108, a wire 109, a signal processing portion 110, a recovery unit 111, a paper feeding tray 112, and the like.

The image sensor unit 10 is, for example, a contact image sensor (CIS) unit. The holding member 106 surrounds and holds the image sensor unit 10. The image sensor unit slide shaft 107 guides the holding member 106 in the sub-scan direction along the platen glass 104. The image sensor unit drive motor 108 is a movement portion as movement means for relatively moving the image sensor unit 10 and the original P, and specifically, the image sensor unit drive motor 108 moves the wire 109 attached to the holding member 106. The recovery unit 111 can be freely opened and closed relative to the housing 103 and is configured to recover the printed sheet 101. The paper feeding tray 112 houses the sheet 101 in a predetermined size.

In the image reading portion 102 with the configuration described above, the image sensor unit drive motor 108 moves the image sensor unit 10 in the sub-scan direction along the image sensor unit slide shaft 107. In this case, the image sensor unit 10 optically reads the original P placed on the platen glass 104 to convert the light to an electrical signal to perform reading operation of the image.

Figure 3:
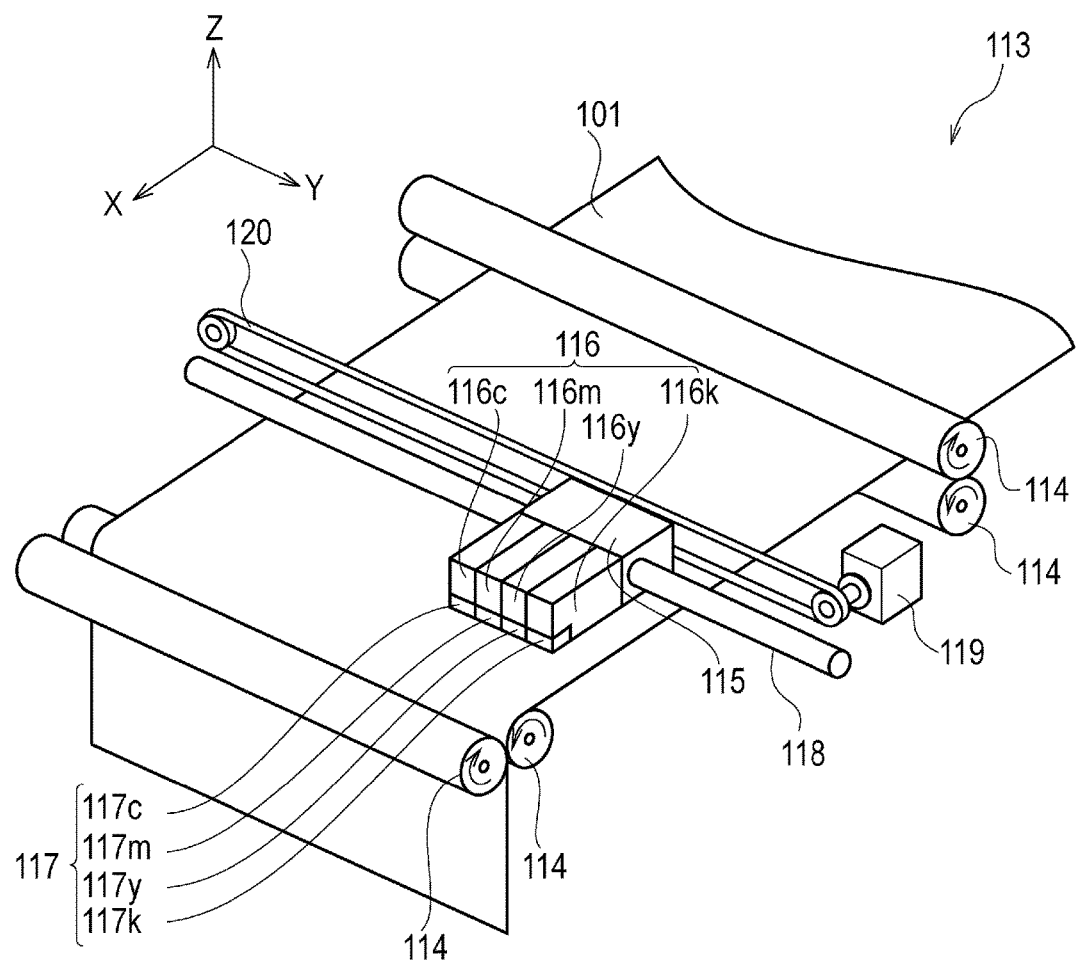
FIG. 3 is a schematic view illustrating a structure of an image forming portion 113 of the MFP 100.

FIG. 3 is a schematic view illustrating a structure of the image forming portion 113.

The image forming portion 113 has a function of a so-called printer and is configured, for example, as follows. The image forming portion 113 is housed in the housing 103 and includes conveyance rollers 114 and a recording head 115 as illustrated in FIG. 3. The recording head 115 includes, for example: ink tanks 116 (116c, 116m, 116y, and 116k) with cyan C, magenta M, yellow Y, and black K inks; and discharge heads 117 (117c, 117m, 117y, and 117k) provided to the ink tanks 116, respectively. The image forming portion 113 also includes a recording head slide shaft 118, a recording head drive motor 119, and a belt 120 attached to the recording head 115.

In the image forming portion 113 with the configuration described above, the conveyance rollers 114 convey the sheet 101 supplied from the paper feeding tray 112 to the recording position. The recording head drive motor 119 mechanically moves the belt 120, and the recording head 115 performs printing on the sheet 101 based on an electrical signal while moving in a printing direction along the recording head slide shaft 118. The operation is repeated until the printing is finished, and the conveyance rollers 114 eject the printed sheet 101 to the recovery unit 111.

Although the inkjet-type image forming apparatus has been described as the image forming portion 113, the type can be any type, such as an electrophotographic type, a thermal transfer type, and a dot impact type.

Figure 1:
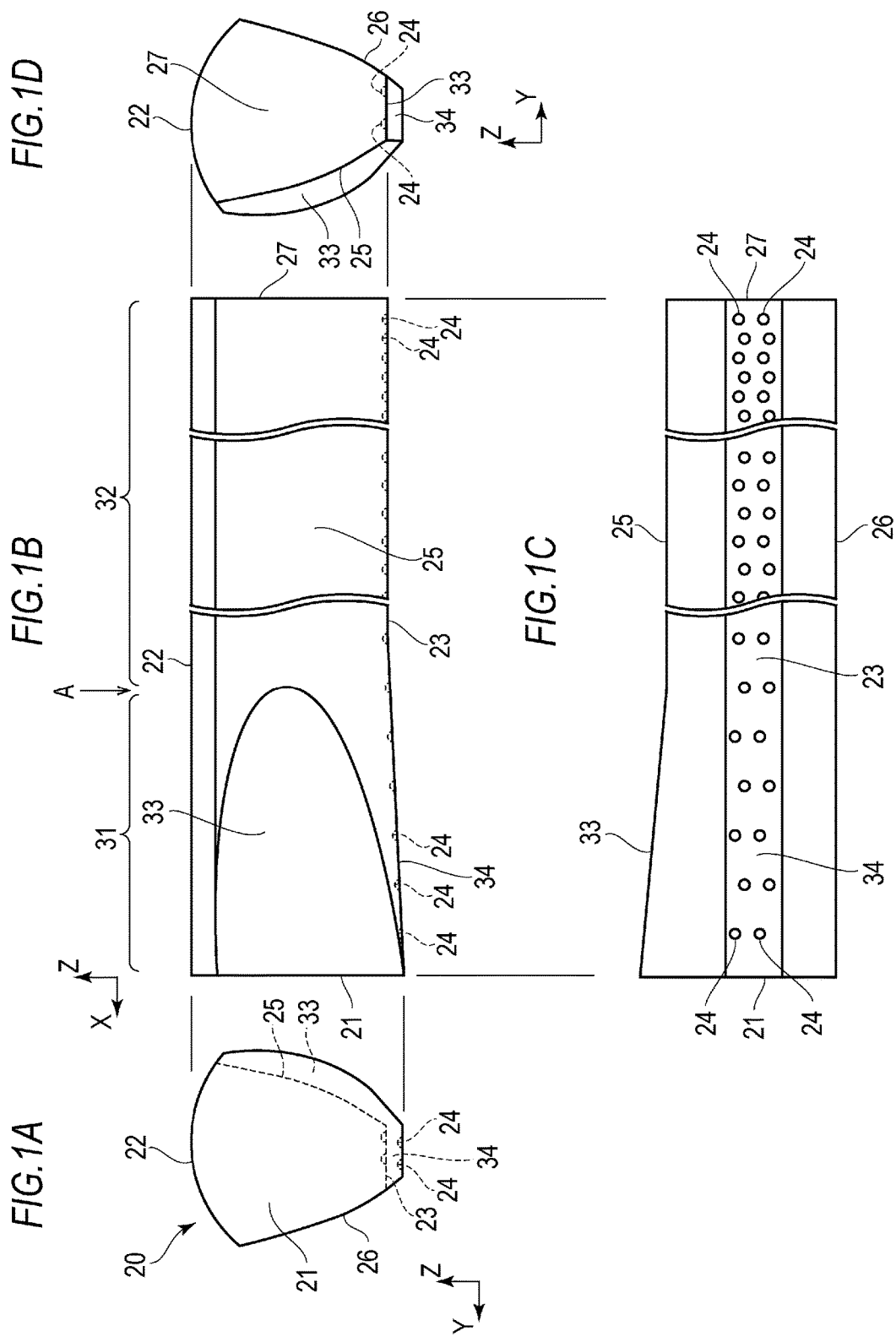
FIGS. 1A to 1D are views illustrating a configuration of a light guide 20 of a first embodiment.
Figure 4:
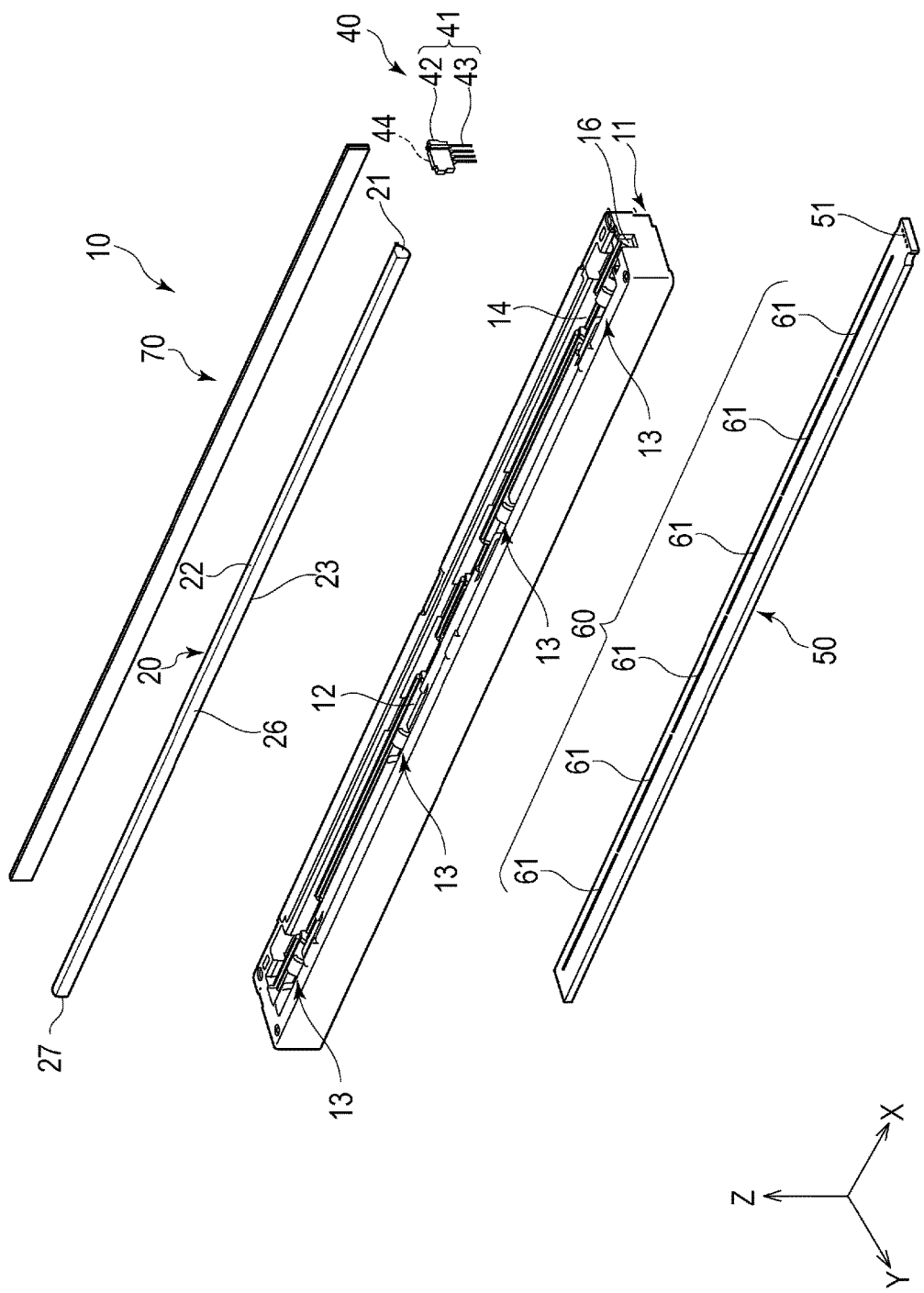
FIG. 4 is an exploded perspective view of the image sensor unit 10.
Figure 5:
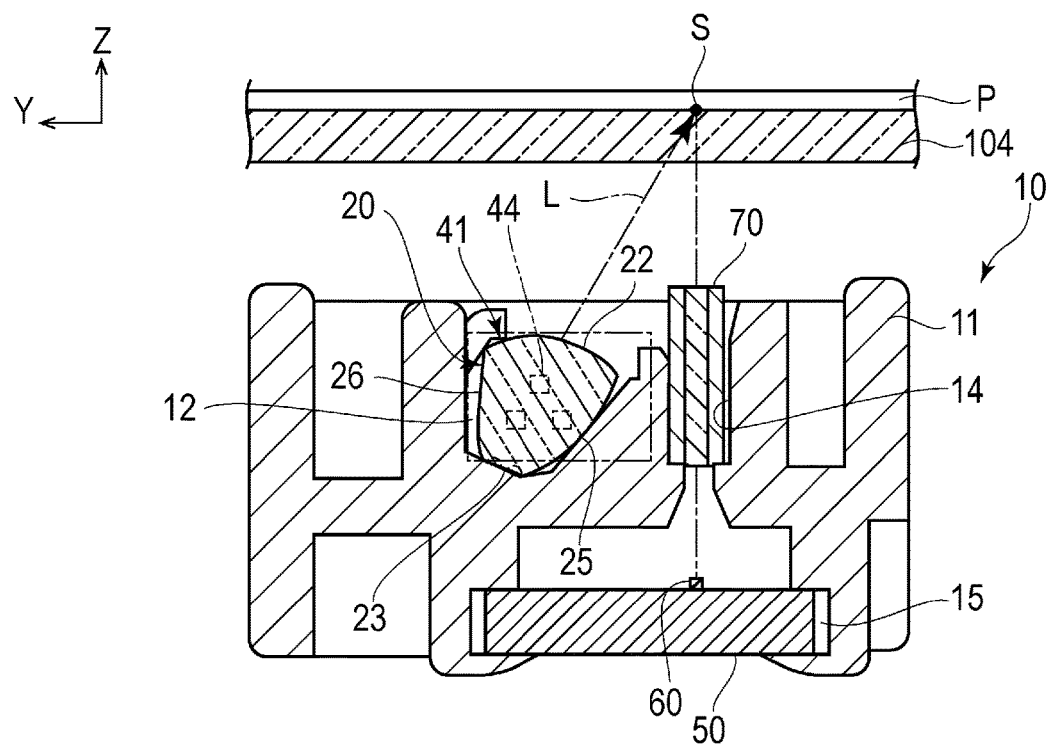
FIG. 5 is a sectional view of the image sensor unit 10.
Figure 10:
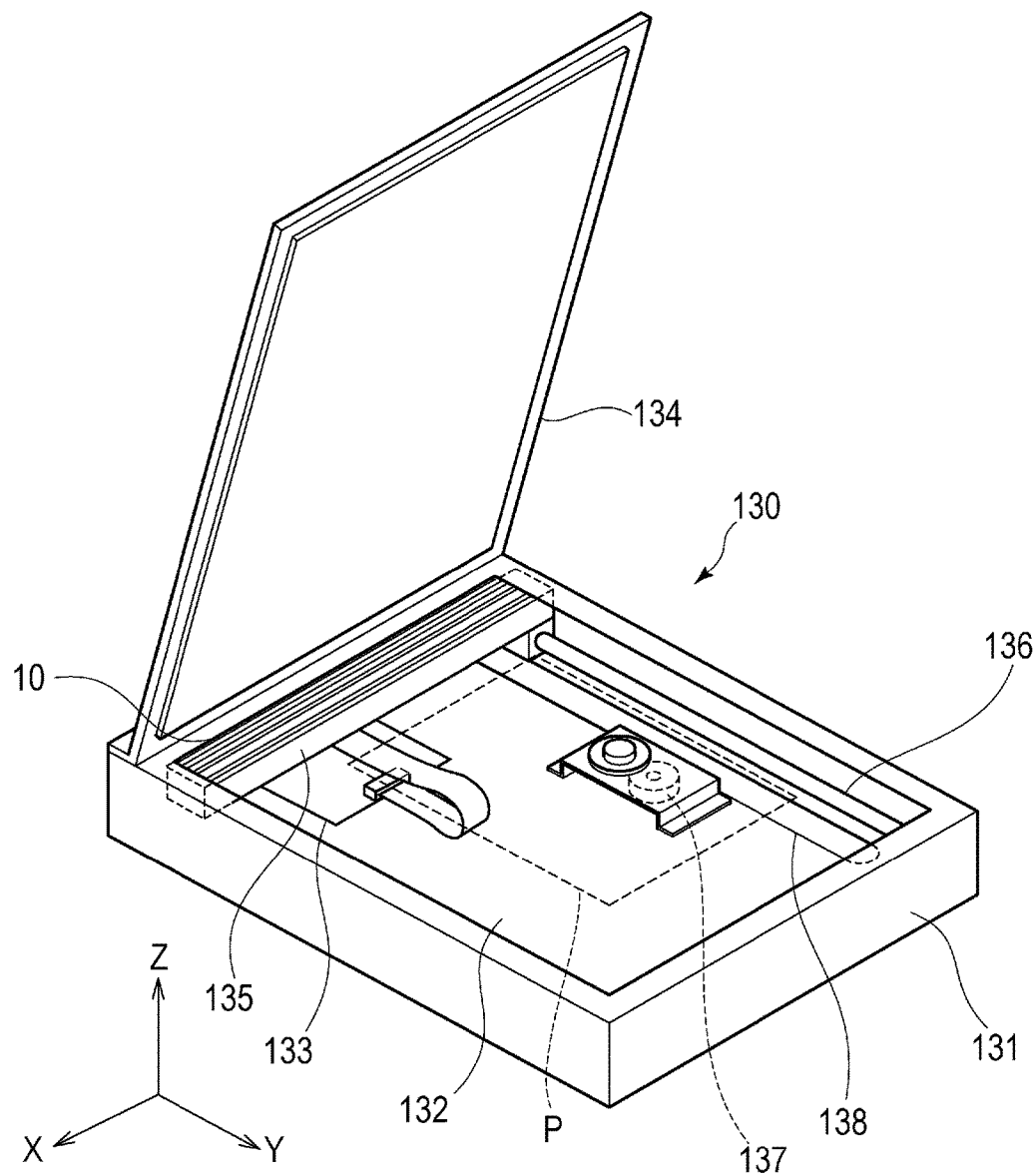
FIG. 10 is a perspective view illustrating an example of a configuration of a flat-bed type scanner.

Next, the image sensor unit 10 of the present embodiment will be described with reference to FIGS. 1A to 19, 4, and 5. FIGS. 1A and 19 are views illustrating a configuration of a light guide 20 described later. FIG. 1A is a view of the light guide 20 in the main-scan direction. FIG. 1B is a view in the sub-scan direction. FIG. 1C is a bottom view of the light guide 20. FIG. 10 is a view of the light guide 20 in the main-scan direction from the opposite side of FIG. 1A. FIG. 4 is an exploded perspective view of the image sensor unit 10. FIG. 5 is a sectional view of the image sensor unit 10.

The image sensor unit 10 includes a frame 11, the light guide 20, a light source 40, a circuit board 50, an image sensor (sensor or line sensor) 60, a light condenser 70, and the like. Among the constituent members, the light source 40 and the light guide 20 function as illumination apparatuses. Among the constituent members described above, the frame 11, the light guide 20, the circuit board 50, the image sensor 60, and the light condenser 70 are formed in lengths according to the dimension in the main-scan direction of the original P to be read.

The frame 11 is a frame that houses the constituent members of the image sensor unit 10 and is formed in a substantially rectangular solid shape with the main-scan direction as a longitudinal direction. The frame 11 is formed by, for example, a light-blocking resin material, such as polycarbonate, colored in black.

As illustrated in FIG. 5, a light guide housing portion 12 that houses the light guide 20 is formed on the frame 11 in the main-scan direction. As illustrated in FIG. 4, a plurality of holding portions 13 that detachably support the light guide are formed on the light guide housing portion 12 of the frame 11 at intervals in the main-scan direction.

A light condenser housing portion 14 that houses the light condenser 70 is formed on the frame 11 in the main-scan direction, adjacent to the light guide housing portion 12. On the lower surface of the frame 11, a board housing portion 15 for arranging the circuit board 50 is formed in a concave shape from the outside of the frame 11 in the main-scan direction. As illustrated in FIG. 4, a light source housing portion 16 to be provided with the light source 40 is formed on one side of the frame 11 in the main-scan direction.

The light guide 20 guides the light emitted by the light source 40 to the original P and is formed in a rod shape, with the main-scan direction as a longitudinal direction. The light guide 20 is positioned by the holding portions 13 of the light guide housing portion 12 of the frame 11 and housed. The light guide 20 is formed by a transparent resin material, such as an acrylic resin and polycarbonate.

As illustrated in FIGS. 1A to 19 and 4, the light guide 20 includes, on one end surface in the main-scan direction, an incident surface 21 that receives the light from the light source 40. The light guide 20 also includes a planar end surface 27 on the end surface facing the incident surface 21. The light guide 20 also includes, on the surface facing the original P, an emission surface 22 in a convex curved shape that emits the light incident on the light guide 20 toward the original P. The light guide 20 also includes, on the surface facing the emission surface 22, a flat reflection surface 23 that reflects the light incident on the incident surface 21. As illustrated in FIGS. 1A to 19, a plurality of diffusion portions 24 that diffuse the light incident on the incident surface 21 toward the emission surface 22 are formed in a dot shape on the reflection surface 23. In the present embodiment, the diffusion portions 24 are formed throughout the entire surface from the incident surface 21 side to the end surface 27 side on the reflection surface 23.

The diffusion portions 24 are formed in a curved shape, specifically, a spherical shape, recessed from the reflection surface 23. A plurality of diffusion portions 24 are formed, and the diffusion portions 24 have the same size. The fact that the sizes of the diffusion portions 24 are the same denotes that all of the outer shape of the diffusion portions 24 on the reflection surface 23, the distance from the reflection surface 23 to the deepest position of the diffusion portions 24, and the radius of curvature when the diffusion portions 24 are curved or spherical are the same. Note that the range of the manufacturing error in molding the diffusion portions is included in the same concept. The density of the diffusion portions 24 is small on the incident surface 21 side, and the density is large on the end surface 27 side. Therefore, the density of the diffusion portions 24 with respect to the reflection surface 23 gradually increases toward the end surface side from the incident surface 21 side on the reflection surface 23. The incident surface 21 side is close to the light source 40, and a large amount of light reaches from the light source 40. Because a large amount of light reaches, the density of the diffusion portions 24 is small on the incident surface 21 side to diffuse the reached light in a small amount, and a desired amount of light is emitted from the emission surface 22 on the incident surface 21 side. On the other hand, the end surface side is far from the light source 40, and a small amount of light reaches from the light source 40. Because a small amount of light reaches, the density of the diffusion portions 24 is increased on the end surface 27 side to diffuse the reached light in a larger amount, and a desired amount of light is emitted from the emission surface 22 on the end surface 27 side. The light incident on the incident surface 21 is reflected by the reflection surface 23 or diffused by the diffusion portions 24, and linear light is emitted to the original P from the emission surface 22.

The light guide 20 includes a first side surface and a second side surface 26 between the emission surface 22 and the reflection surface 23. The first side surface 25 and the second side surface 26 are surfaces different from the emission surface 22 and the reflection surface 23 and are surfaces in the longitudinal direction of the light guide 20.

The first side surface 25 and the second side surface 26 are positioned opposite to each other. Specifically, the first side surface 25 is formed in a convex curved shape connecting the end of one side of the emission surface 22 in the longitudinal direction and the end of one side of the reflection surface 23 in the longitudinal direction. The first side surface mainly functions as a reflection surface for reflecting, in the longitudinal direction of the light guide 20, the light incident on the incident surface 21. The second side surface 26 is formed in a convex curved shape connecting the end of the other side of the emission surface 22 in the longitudinal direction and the end of the other side of the reflection surface 23 in the longitudinal direction. The second side surface 26 functions as a reflection surface for reflecting the light diffused by the diffusion portions 24 in a predetermined direction, specifically, in a direction above the emission surface 22 and substantially perpendicular to the reflection surface 23 (reading line S illustrated in FIG. 5). However, the second side surface 26 also reflects the light in the longitudinal direction of the light guide 20 just like the first side surface 25, depending on the direction and the angle of the light incident on the second side surface 26. Here, the radius of curvature of the first side surface 25 is greater than the radius of curvature of the second side surface 26. When the light guide 20 is housed in the light guide housing portion 12, the first side surface 25 is positioned closer to the light condenser 70 and faces the light condenser 70 across the frame 11. Therefore, when the light guide 20 is housed in the light guide housing portion 12, the first side surface 25 is closer to the light condenser 70 than to the second side surface 26.

The light guide 20 can be manufactured by injection molding using a die. More specifically, an acrylic resin, polycarbonate, or the like as a raw material of the light guide 20 is melted and injected into the die, and the raw material is cooled to manufacture the light guide 20. An electrode in the same shape as the light guide 20 is used to create the die by electrical discharge machining. While the die has projections and recesses opposite the light guide 20, the electrode has the same projections and recesses as the light guide 20. Therefore, the shape of the electrode equivalent to the diffusion portions is also spherical. Thus, a spherical tool can be used to cut the electrode to easily create the shape equivalent to the diffusion portions 24.

The light source 40 emits light to apply the light to the original P through the light guide 20. The light source 40 is connected to the circuit board and housed in the light source housing portion 16 of the frame 11. The light source 40 faces the incident surface 21 of the light guide 20 through a gap when the light source 40 is housed in the frame 11. An LED package 41 is used for the light source 40, for example. The LED package 41 includes a housing 42 formed substantially in a rectangular shape and a plurality of lead terminals 43 protruding from the housing 42. The housing 42 supports a plurality of LED chips 44 as light emitting elements on the surface facing the incident surface 21 of the light guide 20, in a state that the LED chips 44 are sealed by a transparent resin. LED chips with red, green, blue, infrared, and ultraviolet emission wavelengths can be used as the LED chips 44. The reason that the LED chips with infrared and ultraviolet emission wavelengths are used is to read the original P applied with invisible ink for the security.

In FIG. 5, the LED package 41 and the LED chips are illustrated by imaginary lines (alternate long and two short dashes lines) to allow understanding the arrangement of the light source 40 with respect to the light guide 20.

The circuit board 50 is a board for mounting a drive circuit that causes the LED chips 44 to emit light, the image sensor 60, and the like and is formed in a planar shape with the longitudinal direction as a main-scan direction. The circuit board 50 is housed in the board housing portion 15 of the frame 11. A glass epoxy substrate is used for the circuit board 50, for example. Insertion holes for connecting the lead terminals 43 of the LED package 41 are formed on one of the ends of the circuit board 50 in the main-scan direction.

The image sensor 60 receives reflected light reflected from the original P and focused by the light condenser 70 and converts the reflected light to an electrical signal. The circuit board 50 is supported by the board housing portion 15 so that the image sensor 60 is arranged on an extension of the optical axis of the light condenser 70. The image sensor 60 is mounted by linearly arranging, in the main-scan direction and on the mounting surface of the circuit board 50, a predetermined number of image sensor ICs 61 including a plurality of light receiving elements (photoelectric conversion elements) according to the resolution of reading of the image sensor unit 10. It is only necessary that the image sensor 60 can convert the reflected light reflected from the original P to an electrical signal, and various well-known image sensor ICs can be used.

The light condenser 70 is an optical member that focuses the reflected light from the original P on the image sensor 60 and is formed with the longitudinal direction as a main-scan direction. The light condenser 70 is housed in the light condenser housing portion 14 of the frame 11. The light condenser 70 can be, for example, a rod-lens array with a plurality of imaging elements (rod lenses) of an erect equal magnification imaging type linearly arranged in the main-scan direction. The light condenser 70 is not limited to the rod-lens array as long as the reflected light (for example, lens array) can be focused on the image sensor 60, and an optical member with various well-known light condensing functions, such as a micro-lens array, can be used.

As illustrated in FIG. 5, the image sensor unit with the configuration as described above causes the light source 40 arranged in the frame 11 to emit light to apply the light from the light guide 20 to the lower surface of the original P as indicated by an arrow L. Therefore, the light is linearly applied to the original P throughout the reading line S (main-scan direction). The light is reflected by the original P, and the reflected light is focused on the image sensor 60 through the light condenser 70. The image sensor 60 can convert the focused reflected light to an electrical signal to read the image on the lower surface of the original P.

The image sensor 60 reads the reflected light of one scan line to complete the reading operation of one scan line in the main-scan direction of the original P. After the reading operation of one scan line is finished, the reading operation of next one scan line is performed as in the operation described above along with relative movement of the image sensor unit 10 in the sub-scan direction. In this way, the image sensor unit 10 repeats the reading operation of one scan line while moving in the sub-scan direction to successively scan the entire surface of the original P to read the image based on the reflected light.

Next, a configuration that allows preventing a reduction in the amount of light emitted from the light source 40 side in the light emitted from the emission surface 22 of the light guide 20 in the light guide 20 of the present embodiment will be described.

As illustrated in FIGS. 1A to 1D, the area of the light guide 20 is reduced by an inclination of the light guide 20 from the incident surface 21 side to a middle part in the longitudinal direction. The area here is a sectional area cut in a direction orthogonal to the longitudinal direction of the light guide 20.

As illustrated in FIG. 1C, the light guide 20 is inclined as indicated by a first inclined portion 33 described later. Therefore, the width of the light guide 20 between the first side surface 25 and the second side surface 26 is gradually narrowed down from the incident surface 21 to the middle part, and the width is substantially constant from the middle part to the end surface 27. As illustrated in FIG. 1B, the light guide 20 is inclined as indicated by a second inclined portion 34 described later. Therefore, the width of the light guide 20 between the emission surface 22 and the reflection surface 23 is gradually narrowed down from the incident surface 21 to the middle part, and the width is substantially constant from the middle part to the end surface 27.

The light guide 20 of the present embodiment includes: a shape change portion 31 in which the sectional shape and the sectional area vary depending on the position of the light guide 20 in the longitudinal direction; and a shape constant portion in which the sectional shape and the sectional area are the same (or substantially the same) in any position of the light guide 20 in the longitudinal direction. The sectional shape here denotes a sectional shape cut in a direction orthogonal to the longitudinal direction of the light guide 20.

The shape change portion 31 is a certain range in the longitudinal direction on the incident surface 21 side, specifically, a range from the incident surface to a predetermined position A of the light guide in the longitudinal direction. On the other hand, the shape constant portion 32 is a certain range in the longitudinal direction on the end surface 27 side, specifically, a range from the predetermined position A to the end surface 27.

The predetermined position A here is a position between the incident surface 21 and the end surface and is a position closer to the incident surface with respect to the center. In the present embodiment, the distance from the incident surface 21 to the predetermined position A is substantially 9 mm, and the distance from the predetermined position A to the end surface 27 is substantially 218 mm. Therefore, the ratio of the distance from the incident surface 21 to the predetermined position A and the distance from the predetermined position A to the end surface 27 is substantially 1:24.

The sectional shape of the shape change portion changes, and the sectional area is gradually reduced toward the predetermined position A from the incident surface 21 side. In other words, the shape change portion 31 has a bell shape in which the sectional area is gradually enlarged toward the incident surface 21 side from the predetermined position A. In the present embodiment, the area of the incident surface 21 is substantially 8.5 $mm^2$, and the sectional area of the predetermined position A is substantially 7.2 $mm^2$. Therefore, the ratio of the area of the incident surface 21 and the sectional area of the predetermined position A is substantially 1:0.85.

The shape change portion 31 includes a first inclined portion 33 and a second inclined portion 34 on part of the outer periphery as an inclined portion to realize the bell shape of the shape change portion 31. The first inclined portion 33 and the second inclined portion 34 are inclined to a straight line in the longitudinal direction of the light guide 20. The emission surface 22 and the second side surface do not include inclined portions, and the sectional shapes are the same (or substantially the same) in any position in the longitudinal direction.

The first inclined portion 33 is curved and is formed on the first side surface 25. The first inclined portion 33 is enlarged to the outside, toward the incident surface 21 side from the predetermined position A as viewed in the longitudinal direction of the light guide 20, and the radius of curvature of the outline is gradually reduced from the predetermined position A. The outline of the first side surface 25 on the incident surface 21 is the same (or substantially the same) as the radius of curvature of the emission surface 22.

On the other hand, the second inclined portion 34 is planar and is formed on the reflection surface 23. In the second inclined portion 34, the position of the outline heads to the outside, toward the incident surface 21 side from the predetermined position A as viewed in the longitudinal direction of the light guide 20, and the position of the outline shifts parallel toward the first side surface 25 side. Note that the second inclined portion 34 is part of the reflection surface 23, and the diffusion portions 24 are formed on the second inclined portion 34.

When the light guide 20 is housed in the light guide housing portion 12 of the frame 11, the shape change portion 31 and the shape constant portion 32 of the light guide 20 overlap with the light condenser 70 and the image sensor 60 as viewed in the sub-scan direction.

Next, the light guide 20 including the shape change portion 31 in an example of the invention and a light guide 80 including only the shape constant portion 32 in a comparative example will be used to describe reflection of light.

FIG. 6A is a plan view illustrating a trajectory of the reflection of light in the light guide 80 in the comparative example and is a view in the main-scan direction. The first side surface 25 of the light guide 80 does not include the first inclined portion 33. Here, an angle of reflection α of the light in the light from the light source 40 reflected by the first side surface 25 after the light heads toward the first side surface 25 is large without the first inclined portion 33. Therefore, the light advances in the longitudinal direction of the light guide 80. This reduces the light heading toward the diffusion portions 24 arranged on the light source 40 side among the diffusion portions 24 of the light guide 80. Therefore, the light diffused by the diffusion portions 24 on the light source 40 side is reduced, and the amount of light emitted from the light source 40 side in the light guide 80 is reduced.

FIG. 6B is a plan view and a front view illustrating a trajectory of the reflection of light in the light guide 20 of the example of the invention. The diffusion portions 24 are provided on both the shape change portion 31 and the shape constant portion 32 of the light guide 20. The first side surface 25 of the light guide 20 includes the first inclined portion 33. Here, the light heading toward the first side surface 25 in the light from the light source 40 is reflected by the first inclined portion 33, and an angle of reflection β is small. The advance of the light in the longitudinal direction of the light guide 20 is prevented. This increases the light heading toward the diffusion portions 24 arranged on the light source 40 side among the diffusion portions 24 of the light guide 20. Therefore, the light diffused by the diffusion portions 24 on the light source 40 side increases, and a reduction in the amount of light emitted from the light source 40 side in the light guide 20 can be prevented.

The angle of reflection of the light reflected by the reflection surface 23 of the second inclined portion 34 in the light from the light source 40 is small, and the advance of the light in the longitudinal direction of the light guide 20 is prevented as in the first inclined portion 33.

FIGS. 7A and 7B are diagrams illustrating simulations of the trajectories of the reflection of the light in the light guide 80 of the comparative example and in the light guide 20 of the example of the invention, respectively.

In the light guide 20 of the example of the invention illustrated in FIG. 7B, the position of the reflection of the light shifts more slowly toward the incident surface 21 side than in the light guide 80 of the comparative example illustrated in FIG. 7A, as indicated by D1, D2, and D3. The result indicates that the advance of the light in the longitudinal direction of the light guide 20 is prevented.

Figure 8:
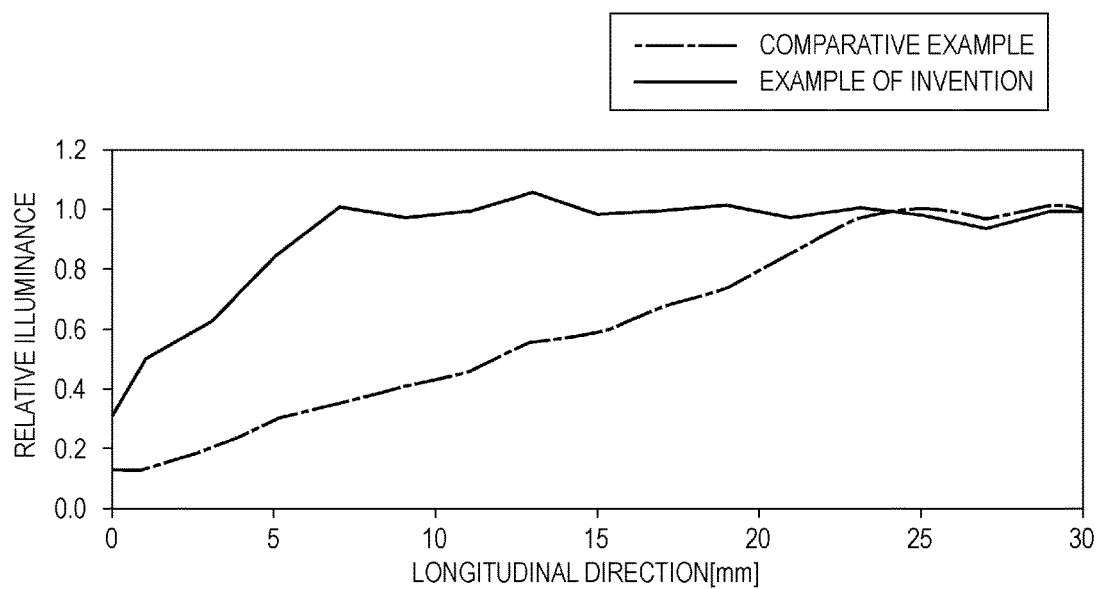
FIG. 8 is a graph illustrating relative illuminance.

FIG. 8 is a graph illustrating relative illuminance when the illuminance in the reading line S of FIGS. 1A to 1D is measured by using the light guide 80 of the comparative example and the light guide 20 of the example of the invention. The alternate short and long dash line indicates the relative illuminance when the light guide 80 of the comparative example is used, and the solid line indicates the relative illuminance when the light guide 20 of the example of the invention is used. Here, the vertical axis indicates relative illuminance, wherein 1 indicates the average illuminance in a range in which the illuminance is substantially constant in the light guide 80 of the comparative example. The horizontal axis indicates the position of the light guide in the longitudinal direction, and the incident surface 21 of the light guide is at 0 mm. Note that the shape change portion 31 is formed from 0 mm to 10 mm on the light guide 20 of the example of the invention.

As illustrated in FIG. 8, while the relative illuminance becomes substantially 1.0 from around 24 mm in the longitudinal direction in the light guide of the comparative example, the relative illuminance becomes substantially 1.0 from around 6 mm in the longitudinal direction in the light guide of the example of the invention. As illustrated in FIG. 8, it can be confirmed that the use of the light guide 20 of the example of the invention prevents the reduction in the amount of light emitted from the light source 40 side in the light emitted from the light guide 20.

In this way, the reduction in the amount of light emitted from the light source 40 side can be prevented to effectively use the light guide 20 throughout the longitudinal direction. More specifically, necessary illuminance can be obtained only from around 24 mm in the longitudinal direction in the light guide 80 of the comparative example, and the length from 0 mm to around 24 mm in the longitudinal direction of the light guide 80 cannot be effectively used. On the other hand, necessary illuminance can be obtained from around 7 mm in the longitudinal direction in the light guide 20 of the example of the invention. Only the length from 0 mm to around 7 mm in the longitudinal direction of the light guide 20 cannot be used, and the readable length of the image sensor unit 10 can be enlarged. In other words, according to the light guide 20 of the example of the invention, sufficient illuminance can be obtained throughout the necessary length even if the length in the longitudinal direction is reduced, as compared to the light guide 80 of the comparative example. Therefore, the illumination apparatus or the image sensor unit 10 can be downsized.

According to the present embodiment, the area of the light guide 20 is reduced by the inclination of the light guide 20 from the incident surface 21 side to the middle part in the longitudinal direction of the light guide 20, and the light guide 20 is provided with the diffusion portions 24 from the incident surface 21 side to the middle part on the reflection surface 23. In this way, the light guide 20 is inclined such that the area is reduced from the incident surface 21 side to the middle part. Therefore, the angle of reflection of the light reflected by the inclined part in the light incident on the incident surface 21 is small, and the advance of the light in the longitudinal direction of the light guide 20 is prevented. There are more opportunities for the diffusion portions 24 of the reflection surface 23 provided from the incident surface 21 side to the middle part to diffuse the light prevented to advance, and a decrease in the amount of light emitted from the light source 40 side of the light guide 20 can be prevented.

Here, the inclined part is equivalent to the first inclined portion 33 and the second inclined portion 34. However, the inclined part may be one of the first inclined portion 33 and the second inclined portion 34. The inclined part may be included on the second side surface 26 or may be included throughout the entire periphery of the light guide 20.

In the present embodiment, the shape change portion 31 includes the first inclined portion 33 and the second inclined portion 34 that are at least part of the outer periphery of the light guide 20 and that are inclined in the longitudinal direction of the light guide 20. In this way, the shape change portion 31 includes the first inclined portion 33 and the second inclined portion 34, and the angle of reflection of the light reflected by the first inclined portion 33 and the second inclined portion in the light incident on the incident surface 21 is reduced. Therefore, the advance of the light in the longitudinal direction of the light guide 20 is prevented. The shape change portion 31 may include the inclined portions not only on part of the outer periphery, but also throughout the entire periphery.

Of the first side surface 25 and the second side surface 26, only the first side surface 25 includes the first inclined portion 33 in the present embodiment. In other words, the second side surface does not include the inclined portion, and this can prevent a reduction in the function of the second side surface 26 for reflecting the light in a predetermined direction. To attain such an effect, the light guide 20 may not be provided with the diffusion portions 24 from the incident surface 21 side to the middle part on the reflection surface 23.

Of the emission surface 22 and the reflection surface 23, only the reflection surface 23 includes the second inclined portion 34 in the present embodiment. In other words, the emission surface 22 does not include the inclined portion, and this can prevent a reduction in the function of the emission surface 22 for emitting the light in a predetermined direction. To attain such an effect, the light guide 20 may not be provided with the diffusion portions 24 from the incident surface 21 side to the middle part on the reflection surface 23.

In the present embodiment, the inclined part of the light guide 20 overlaps with the light condenser 70 and the image sensor 60 in the sub-scan direction. Therefore, the light emitted from the light source 40 side of the light guide 20 can also be focused on the image sensor 60 by the overlapping light condenser 70 after the light is reflected by the original S, and the effective reading area can be expanded.

In the present embodiment, a plurality of diffusion portions 24 are formed, and the diffusion portions 24 have the same size. Therefore, the light guide 20 including the diffusion portions 24 can be easily manufactured.

In the present embodiment, the area of the light guide 20 is reduced by the inclination of the light guide 20 from the incident surface 21 side to the middle part in the longitudinal direction of the light guide 20, and the light guide 20 includes the inclined part only on the first side surface 25 of the first side surface 25 and the second side surface 26. This can prevent the advance of the light in the longitudinal direction of the light guide 20 and can prevent a reduction in the function of the second side surface 26 for reflecting the light in a predetermined direction.

Second Embodiment

A positioning portion 90 is formed on the light guide 20 in the case described in the present embodiment. The same reference signs are provided to the same components as in the first embodiment, and the description of the same components will not be repeated.

FIGS. 9A and 9B are diagrams illustrating a configuration of the light guide 20 of a second embodiment.

The positioning portion 90 is integrally molded on the position of the light guide 20 where the incident surface 21 is provided in the first embodiment. In the present embodiment, an end surface of the positioning portion 90 is an incident surface 91 that receives the light from the light source 40. The positioning portion 90 is rectangular as viewed in the longitudinal direction of the light guide 20 and functions as a flange portion larger than the sectional shape of the light guide 20. More specifically, the positioning portion 90 of the light guide 20 can be fitted into a predetermined position of the frame 11 to position the light guide 20 with respect to the frame 11. On the other hand, the end surface 27 of the light guide 20 is not positioned with respect to the frame 11 to allow setting the positioning portion 90 as a fixed end and setting the end surface 27 of the light guide 20 as a free end. Therefore, even when the light guide 20 expands or contracts according to a change in the environmental temperature, only the end surface 27 side of the light guide 20 moves in the longitudinal direction of the light guide 20, and the distance between the incident surface 91 of the positioning portion 90 and the light source 40 can be maintained.

The own light guide 20 is as in the first embodiment and includes: the shape change portion 31 in which the shape change portion 31 changes, and the sectional area is gradually reduced toward the predetermined position A in the longitudinal direction of the light guide 20 from the incident surface 91 side; and the shape constant portion 32 in which the sectional shape is the same from the predetermined position A to the end surface 27 side. The sectional shape here is a shape surrounded by the emission surface 22, the reflection surface 23, the first side surface 25, and the second side surface 26 and does not include the positioning portion 90. In other words, the shape change portion 31 does not include the positioning portion 90.

According to the present embodiment, the positioning portion 90 is integrally molded on the light guide 20, and the light guide 20 can be easily positioned on the frame 11.

Third Embodiment

Next, a configuration in which the image sensor unit 10 is applied to a flat-bed type scanner 130 as an image reading apparatus will be described with reference to FIG. 10.

FIG. 10 is a perspective view illustrating an example of the configuration of the flat-bed type scanner 130.

The scanner 130 includes a housing 131, a platen glass 132 as an illuminated object placing portion, the image sensor unit 10, a driving mechanism that drives the image sensor unit 10, a circuit board 133, and a platen cover 134. The platen glass 132 is made of a transparent plate, such as glass, and is attached to the upper surface of the housing 131. The platen cover 134 is attached to the housing 131 through a hinge mechanism or the like so as to cover the original P placed on the platen glass 132, and the platen cover 134 can be opened and closed. The image sensor unit 10, the driving mechanism that drives the image sensor unit 10, and the circuit board 133 are housed in the housing 131.

The driving mechanism includes a holding member 135, a guide shaft 136, a drive motor 137, and a wire 138. The holding member 135 surrounds and holds the image sensor unit 10. The guide shaft 136 guides the holding member 135 to allow the holding member 135 to move in the reading direction (sub-scan direction) along the platen glass 132. The drive motor 137 and the holding member 135 are coupled through the wire 138 and move the holding member 135 holding the image sensor unit 10 in the sub-scan direction based on the driving force of the drive motor 137. The image sensor unit 10 reads the original P placed on the platen glass 132 while moving in the sub-scan direction based on the driving force of the drive motor 137. In this way, the original P is read, while the image sensor unit 10 and the original P are relatively moved.

An image processing circuit that applies predetermined image processing to the image read by the image sensor unit 10, a control circuit that controls each unit of the scanner 130 including the image sensor unit 10, a power circuit that supplies power to each unit of the scanner 130, and the like are constructed on the circuit board 133.

Fourth Embodiment

Next, a configuration in which the image sensor unit 10 is applied to a sheet-feed type scanner 140 as an image reading apparatus will be described with reference to FIG. 11.

Figure 11:
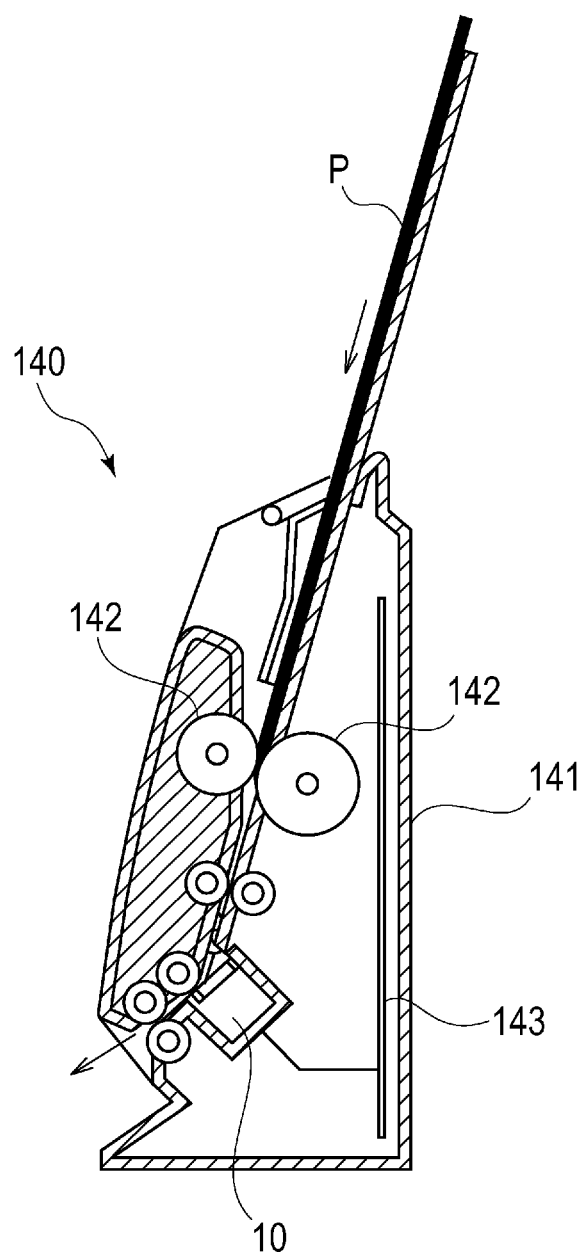
FIG. 11 is a sectional view illustrating an example of a configuration of a sheet-feed type scanner.

FIG. 11 is a sectional view illustrating an example of the configuration of the sheet-feed type scanner 140. The scanner 140 includes a housing 141, the image sensor unit 10, conveyance rollers 142, and a circuit board 143. A driving mechanism not illustrated rotates the conveyance rollers 142, and the original P is conveyed between the conveyance rollers 142. A control circuit that controls each unit of the scanner 140 including the image sensor unit 10, a power circuit that supplies power to each unit of the scanner 140, and the like are constructed on the circuit board 143.

In the scanner 140, the image sensor unit 10 reads the original P, while the conveyance rollers 142 convey the original P in the reading direction (sub-scan direction). Therefore, the original P is read, while the image sensor unit 10 and the original P are relatively moved. Although FIG. 11 illustrates an example of the scanner 140 that reads one side of the original P, two image sensor units 10 facing each other across the conveyance path of the original P may be provided to read both sides of the original P.

Although the present invention has been described based on the embodiments, the present invention is not limited to the embodiments, and changes can be made within the scope of the present invention.

Although the diffusion portions 24 have a hemispherical shape recessed from the reflection surface 23 in the description of the embodiments, the diffusion portions 24 are not limited to these, and for example, a dot-like pattern shape may be formed by silk screen printing or the like.

Although the light guide 20 includes reflection surfaces, such as the first side surface 25 and the second side surface 26, in the description of the embodiments, the arrangement is not limited to this, and the light guide 20 may include other reflection surfaces. Although the first side surface 25 and the second side surface 26 have convex curved shapes in the description, the arrangement is not limited to this. The first side surface 25 and the second side surface 26 may have substantially curved shapes in which a plurality of planes are continuously connected, or the first side surface 25 and the second side surface 26 may be planar.

Although the shape constant portion 32 is provided in the range from the predetermined position A of the light guide 20 to the end surface 27 in the description of the embodiments, the arrangement is not limited to this. For example, when the end surface 27 includes, for example, a positioning portion or the like that functions as a flange portion, the shape constant portion 32 can be provided in a range from the predetermined position A to the end surface 27 side excluding the positioning portion.

Note that at least one of the image sensor unit and the original P may be relatively moved by the movement portion.

According to the present invention, the reduction in the amount of light emitted from the light source side in the light emitted from the light guide can be prevented.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An illumination apparatus that emits light to an illuminated object, the illumination apparatus comprising:
   a light source; and
   a rod-shaped light guide comprising: an incident surface from which light from the light source enters; a reflection surface provided with a diffusion portion that diffuses the light entered from the incident surface; and an emission surface that emits the light diffused by the diffusion portion to the illuminated object, wherein
   the light guide further comprises an inclined part in which an area of the light guide is reduced by an inclination of the light guide from the incident surface side to a middle part in a longitudinal direction of the light guide, and the light guide is provided with the diffusion portion from the incident surface side to the middle part on the reflection surface,
   wherein the light guide further comprises: a first side surface in the longitudinal direction that is a surface different from the emission surface and the reflection surface; and a second side surface on an opposite side of the first side surface, and
   the light guide comprises the inclined part only on the first side surface in the longitudinal direction, of the first side surface and the second side surface, wherein the second side surface is not inclined in the longitudinal direction.

2. The illumination apparatus according to claim 1, wherein
   the first side surface is
   a surface connecting an end on one side in a longitudinal direction of the emission surface and an end on one side in a longitudinal direction of the reflection surface, and
   the second side surface is
   a surface connecting an end on another side in the longitudinal direction of the emission surface and an end on another side in the longitudinal direction of the reflection surface.

3. The illumination apparatus according to claim 1, wherein
   the light guide comprises the inclined part only on the reflection surface, of the emission surface and the reflection surface.

4. The illumination apparatus according to claim 1, wherein
the diffusion portion has a curved shape recessed from the reflection surface.

5. The illumination apparatus according to claim 1, wherein
the diffusion portion is provided on an entire surface of the reflection surface.

6. The illumination apparatus according to claim 1, wherein
a plurality of the diffusion portions are provided, and the plurality of diffusion portions have the same size.

7. A sensor unit comprising:
an illumination apparatus that emits light to an illuminated object, the illumination apparatus comprising:
a light source; and
a rod-shaped light guide comprising: an incident surface from which light from the light source enters; a reflection surface provided with a diffusion portion that diffuses the light entered from the incident surface; and an emission surface that emits the light diffused by the diffusion portion to the illuminated object, wherein
the light guide further comprises an inclined part in which an area of the light guide is reduced by an inclination of the light guide from the incident surface side to a middle part in a longitudinal direction of the light guide, and the light guide is provided with the diffusion portion from the incident surface side to the middle part on the reflection surface,
wherein the light guide further comprises: a first side surface in the longitudinal direction that is a surface different from the emission surface and the reflection surface; and a second side surface on an opposite side of the first side surface, and
the light guide comprises the inclined part only on the first side surface in the longitudinal direction, of the first side surface and the second side surface, wherein the second side surface is not inclined in the longitudinal direction;
a lens array that focuses light reflected by an illuminated object after the light is applied to the illuminated object by the illumination apparatus; and
a sensor that converts the light focused by the lens array to an electric signal.

8. An illumination apparatus that emits light to an illuminated object, the illumination apparatus comprising:
a light source; and
a rod-shaped light guide comprising: an incident surface from which light from the light source enters; a reflection surface provided with a diffusion portion that diffuses the light entered from the incident surface; and an emission surface that emits the light diffused by the diffusion portion to the illuminated object, wherein
the light guide further comprises: a first side surface in a longitudinal direction of the light guide that is a surface different from the emission surface and the reflection surface; and a second side surface on an opposite side of the first side surface,
the light guide further comprises an inclined part in which an area of the light guide is reduced by an inclination of the light guide from the incident surface side to a middle part in the longitudinal direction of the light guide, and the light guide is provided with the diffusion portion from the incident surface side to the middle part on the reflection surface, and
the light guide comprises the inclined part only on the first side surface in the longitudinal direction, of the first side surface and the second side surface, wherein the second side surface is not inclined in the longitudinal direction.

9. The illumination apparatus according to claim 8, wherein
the first side surface is
a surface connecting an end on one side in a longitudinal direction of the emission surface and an end on one side in a longitudinal direction of the reflection surface, and
the second side surface is
a surface connecting an end on another side in the longitudinal direction of the emission surface and an end on another side in the longitudinal direction of the reflection surface.

10. The illumination apparatus according to claim 8, wherein
the light guide comprises the inclined part only on the reflection surface, of the emission surface and the reflection surface.

11. The illumination apparatus according to claim 8, wherein
the diffusion portion has a curved shape recessed from the reflection surface.

12. The illumination apparatus according to claim 8, wherein
the diffusion portion is provided on an entire surface of the reflection surface.

13. The illumination apparatus according to claim 8, wherein
a plurality of diffusion portions are provided, and sizes of the plurality of diffusion portions are same.

14. A sensor unit comprising:
an illumination apparatus that emits light to an illuminated object, the illumination apparatus comprising:
a light source; and
a rod-shaped light guide comprising: an incident surface from which light from the light source enters; a reflection surface provided with a diffusion portion that diffuses the light entered from the incident surface; and an emission surface that emits the light diffused by the diffusion portion to the illuminated object, wherein
the light guide further comprises: a first side surface in a longitudinal direction of the light guide that is a surface different from the emission surface and the reflection surface; and a second side surface on an opposite side of the first side surface,
the light guide further comprises an inclined part in which an area of the light guide is reduced by an inclination of the light guide from the incident surface side to a middle part in the longitudinal direction of the light guide, and the light guide is provided with the diffusion portion from the incident surface side to the middle part on the reflection surface, and
the light guide comprises the inclined part only on the first side surface in the longitudinal direction, of the first side surface and the second side surface, wherein the second side surface is not inclined in the longitudinal direction;
a lens array that focuses light reflected by an illuminated object after the light is applied to the illuminated object by the illumination apparatus; and a sensor that converts the light focused by the lens array to an electric signal.

* * * * *